March 27, 1934.  R. DE LONG  1,952,746
SIGHT FEED MECHANICAL LUBRICATOR
Filed June 21, 1930  2 Sheets-Sheet 1

INVENTOR.
Raleigh De Long
BY
Hardway Pattley
ATTORNEYS.

March 27, 1934. R. DE LONG 1,952,746
SIGHT FEED MECHANICAL LUBRICATOR
Filed June 21, 1930 2 Sheets-Sheet 2

INVENTOR.
Raleigh De Long
BY
Hardway Cather
ATTORNEY

Patented Mar. 27, 1934

1,952,746

UNITED STATES PATENT OFFICE 1,952,746

SIGHT FEED MECHANICAL LUBRICATOR

Raleigh De Long, Houston, Tex.

Application June 21, 1930, Serial No. 462,830

1 Claim. (Cl. 184—27)

This invention relates to new and useful improvements in a sight feed mechanical lubricator.

One object of the invention is to provide a lubricator of the character described, specially designed for the purpose of lubricating the contacting faces of relatively movable parts of prime movers, compressors, and the like and which is of such construction that it may be located remote from the parts to be lubricated, will operate without waste of the lubricant and without the necessity of frequent repairs.

Another object of the invention is to provide a lubricator of the character described which is effective to secure a constant and uniform feed of the lubricant to the bearings to be lubricated.

A further feature of the invention is to provide a lubricator of the character described wherein the flow of the lubricant is visible.

While the lubricator is specially designed for use on motors, compressors and the like, it is capable of general application and use.

With the above and other objects in view the invention has particular relation to certain novel features of construction, operation and arrangement of parts, an example of which is given in this specification and illustrated in the accompanying drawings wherein:—

Figure 1:
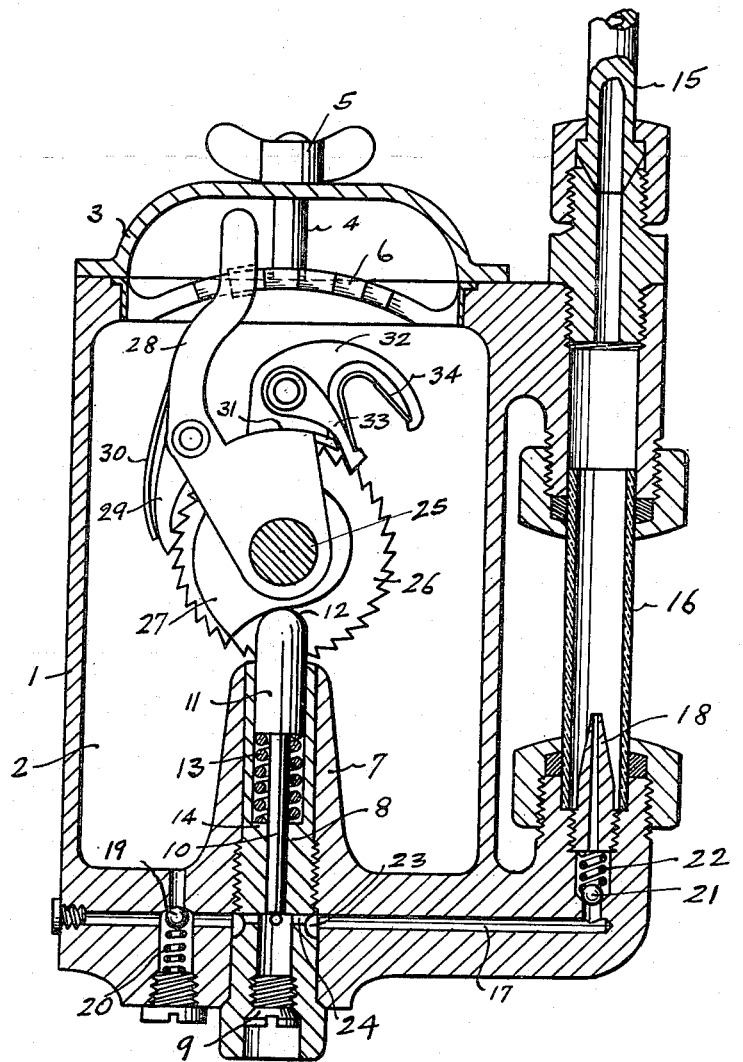
Figure 1 shows a vertical sectional view of the lubricator.
Figure 2:
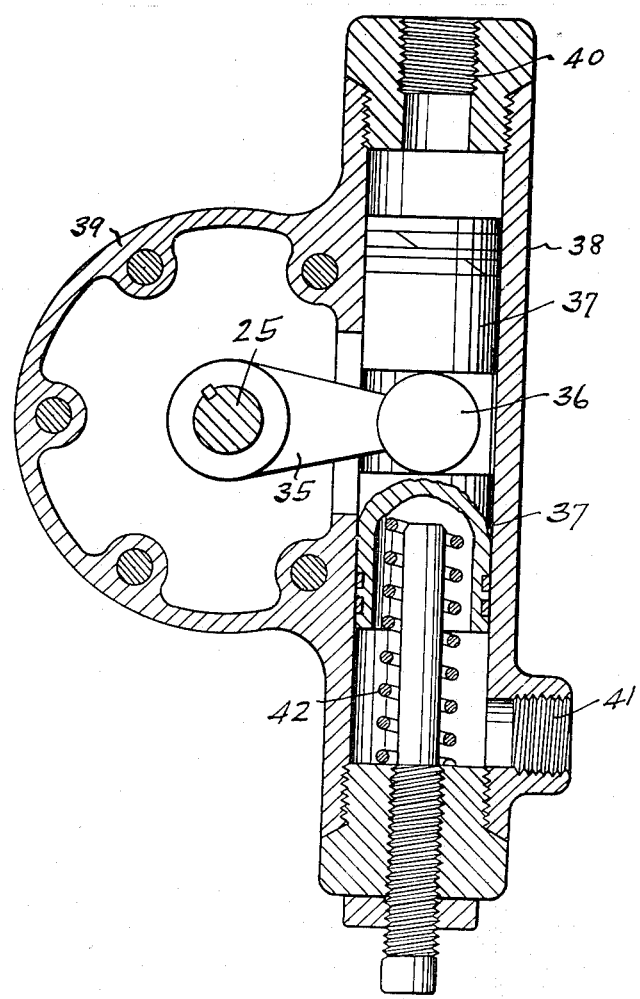
Figure 2 shows a vertical sectional view of the operating mechanism.

Referring now more particularly to the drawings wherein like numerals of reference designate similar parts in each of the figures, the numeral 1 designates the lubricator casing having a lubricant chamber, 2, therein, which is enclosed by the removable cover plate 3, retained in place by means of the stud 4 and the wing nut 5 threaded onto said bolt and abutting the outer side of said cover plate. In the upper part of the casing there is the arcuate rack 6.

Within the casing 1, and upstanding from the bottom thereof there is the sleeve 7 fitted upwardly through which there is a cylinder 8 which has a threaded connection with the casing and whose lower end is closed by the plug 9. A plunger 10 works in the cylinder and whose upper end 11 is enlarged and rounded off as at 12. This plunger is supported on the coil spring 13 which is located within the cylinder and which is interposed between the enlarged upper end of the plunger 11 and the internal annular shoulder 14 of the cylinder. There is a delivery line 15 suitably connected to the casing 1, and a section 16 of which may be formed of transparent material. A channel 17 leads from the bottom of the chamber 2 and continues through the upstanding nozzle 18 within the lower end of the section 16 of the delivery line. This channel is controlled by the downwardly opening ball valve 19 which is seated on the coil spring 20 and by the upwardly ball valve 21 which is seated against the coil spring 22. Between said valves the channel 17 is connected into an annular groove 23 around the cylinder which groove is connected into the cylinder through suitable ports 24.

There is a transverse rocker shaft 25 having suitable bearings in the casing 1 and loosely mounted on said shaft within the chamber 2 there is a ratchet wheel 26 fixed to which there is a cam 27 against which the outer end of the plunger bears. There is an arm 28 one end of which has a loose bearing on the shaft 25 and whose other end is adjacent the rack 6. This arm has the spring pressed pawl 29 pivoted thereon and normally held in engagement with the ratchet wheel 26 by the spring 30, so as to confine said ratchet wheel to one way rotation. The arm 28 carries an arcuate hood 31 which shields a portion of the teeth of the ratchet wheel 26 for a purpose to be hereinafter stated. Fixed to the shaft 25 there is a throw arm 32 which supports a pivotally mounted spring pressed pawl 33 normally held in engagement with the teeth of the ratchet wheel 26 by a pressure spring 34. The shaft 25 will be rocked back and forth as is hereinafter explained and as it moves in one direction, the pawl 33 engages and partially rotates the ratchet wheel 26 and as it moves in the other direction, said ratchet wheel will be held by the pawl 29 against backward rotation. The ratchet wheel and the cam 27 carried thereby are thus rotated intermittently. The arm 28 may be adjusted back and forth, thus adjusting the hood 31 toward and from the pawl 33. When adjusted into one position said pawl 33, during its active stroke will ride for a portion of said stroke on said hood. When the arm 28 is adjusted to another position the hood 31 will be adjusted with it away from the pawl 33 so that during the full active stroke of said pawl 33 it will be in engagement with the ratchet wheel 26. It is thus obvious that by adjusting the hood 31 the effective movement of the pawl 33 may be varied and the range on corresponding partial rotation of the pawl 26 will be correspondingly varied. The arm 28 may be held in desired position of adjustment by its engagement with the rack 6. The rocker shaft 25 has an actuating arm 35 fixed thereon whose free end has a bearing member 36 thereon which works between the plungers 37, 37 in the cylinder 38. This cylinder is supported by a suitable housing 39 which may be bolted or otherwise secured to the casing 1. The cylinder 38 has the end connections 40, 41, through which steam or other pressure fluid may be applied alternately against the outer ends of the plungers 37. The operating fluid of the prime mover may be thus utilized to actuate said plungers and thereby rock the shaft 25. If desired, one of these plungers may be mounted on a coil spring 42 and the corresponding connection 41 left open to the atmosphere and in such case the operating fluid will actuate the plungers in one direction and when relieved, the spring 42 will actuate them in the other direction to accomplish the rocking movement of the shaft 25.

The cam 27 is of such formation that when the plunger 10 passes the high point of the cam a suction stroke will be imparted to said plunger suddenly by the spring 13 and a charge of lubricant will be drawn into the cylinder 8 from the chamber 2 and thereafter the gradually enlarging cam 27 will gradually force the plunger 10 outwardly thus gradually forcing the charge of lubricant out through the channel 17 and the nozzle 18 into the tubing 16 which is filled with water or other liquid heavier than the lubricant and the lubricant will rise, passing through the water on out the discharge line 15 to the parts to be lubricated, thus rendering the effective operation of the lubricator visible so that by inspection it can be readily ascertained whether or not the lubricator is properly working.

The drawings and description disclose what is now considered to be a preferred form of the invention by way of illustration only while the broad principle of the invention will be defined by the appended claim.

What I claim is:

A sight feed mechanical lubricator comprising a casing having a lubricant chamber therein, a removable cover plate thereon, a rack member in the casing adjacent said cover plate, an inwardly extending sleeve at the opposite end of the casing; a removable cylinder through said sleeve, a yieldingly mounted plunger in said cylinder, a delivery line, there being a channel leading from said chamber and entering said delivery line and also connecting into said cylinder, valves controlling said channel and confining the flow of fluid therethrough to an outward movement from said chamber, means for intermittently moving the plunger outwardly, said plunger moving means comprising a rocker shaft, a ratchet wheel in said chamber loosely mounted on said shaft, a cam fixed to said ratchet wheel and bearing against the inner end of the plunger, an arm loosely mounted on said shaft, at one end, and whose other end is arranged adjacent said rack, a spring pressed pawl on said arm, normally in engagement with said ratchet wheel, an arcuate hood carried by said arm shaped to shield a portion of the teeth of said ratchet wheel, a throw arm fixed to said shaft, a pivotally mounted spring pressed pawl on said throw arm normally held in engagement with the teeth of said ratchet wheel, said hood and the arm on which it is mounted being adjustable relative to the last mentioned pawl to vary the effective range of movement of said pawl, said last mentioned arm being engageable by the rack to hold said arm and hood at selected points of adjustment.

RALEIGH DE LONG.